United States Patent
Crane et al.

(10) Patent No.: US 9,823,469 B2
(45) Date of Patent: Nov. 21, 2017

(54) PROJECTOR UTILIZING OPAQUE / TRANSPARENT PROJECTION SCREEN

(71) Applicants: Magna International Inc., Aurora (CA); Michael W. Crane, Oakland Township, MI (US); Anthony J. Povinelli, Romeo, MI (US); Thomas Pilette, Lake Orion, MI (US)

(72) Inventors: Michael W. Crane, Oakland Township, MI (US); Anthony J. Povinelli, Romeo, MI (US); Thomas Pilette, Lake Orion, MI (US)

(73) Assignee: Magna International Inc., Rochester Hills, MI (US)

( * ) Notice: Subject to any disclaimer, the term of this patent is extended or adjusted under 35 U.S.C. 154(b) by 0 days.

(21) Appl. No.: 14/777,263

(22) PCT Filed: May 9, 2014

(86) PCT No.: PCT/US2014/037503
§ 371 (c)(1),
(2) Date: Sep. 15, 2015

(87) PCT Pub. No.: WO2014/183037
PCT Pub. Date: Nov. 13, 2014

(65) Prior Publication Data
US 2016/0048016 A1  Feb. 18, 2016

Related U.S. Application Data
(60) Provisional application No. 61/821,919, filed on May 10, 2013.

(51) Int. Cl.
G02F 1/13    (2006.01)
G02B 27/01   (2006.01)
(Continued)

(52) U.S. Cl.
CPC ....... *G02B 27/0101* (2013.01); *G02F 1/1313* (2013.01); *G02F 1/17* (2013.01);
(Continued)

(58) Field of Classification Search
None
See application file for complete search history.

(56) References Cited

U.S. PATENT DOCUMENTS

2003/0067432 A1*  4/2003  Watanabe ............... B60K 35/00
                                                        345/87
2004/0008412 A1*  1/2004  Jiang .................... G02B 27/283
                                                        359/487.02
(Continued)

FOREIGN PATENT DOCUMENTS

DE   WO 9828649 A1 *  7/1998  ............. B60K 35/00
JP   2008209724 A     9/2008

*Primary Examiner* — Ryan Crockett
(74) *Attorney, Agent, or Firm* — Warn Partners, P.C.

(57) ABSTRACT

A projector assembly having a projecting device and a display screen with a film. The display screen is changeable from between opaque and transparent and the projecting device selectively rear projects an image onto the film such that the image is visible to a user generally from the front side of the screen. When the projector is off or the projection of images is otherwise stopped under predetermined conditions, the screen becomes transparent to provide the user a clear view through the display screen. When the projector is off power is simultaneously applied to the film which becomes transparent. A control device coordinates the application of power with the image projection, such that when the projected image is removed the screen becomes clear to see through the display screen, and when the projected image returns the screen becomes opaque for viewing the image.

14 Claims, 1 Drawing Sheet

(51) Int. Cl.
*G02F 1/17* (2006.01)
*G03B 21/14* (2006.01)
*G03B 21/60* (2014.01)
*G03B 21/62* (2014.01)
*G03B 21/56* (2006.01)

(52) U.S. Cl.
CPC ........... *G03B 21/145* (2013.01); *G03B 21/56* (2013.01); *G03B 21/60* (2013.01); *G03B 21/62* (2013.01)

(56) References Cited

U.S. PATENT DOCUMENTS

| | | | |
|---|---|---|---|
| 2008/0048932 A1* | 2/2008 | Yanagisawa | G01C 21/36 345/9 |
| 2008/0180605 A1* | 7/2008 | Kim | G02F 1/1393 349/96 |
| 2011/0069242 A1* | 3/2011 | Mashitani | G03B 21/62 349/5 |
| 2016/0139409 A1* | 5/2016 | Graf | G02B 27/0149 359/630 |

* cited by examiner

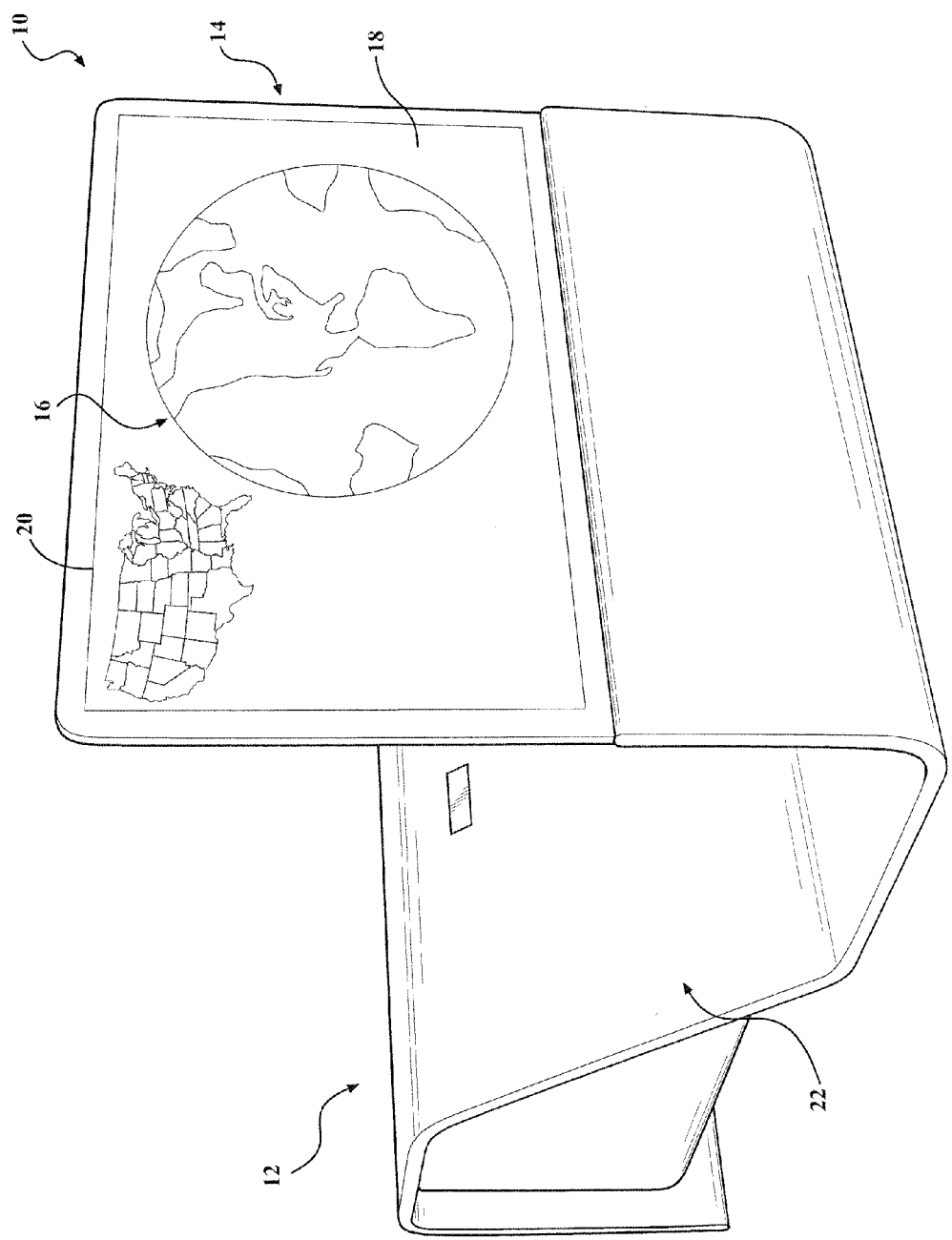

PROJECTOR UTILIZING OPAQUE / TRANSPARENT PROJECTION SCREEN

CROSS-REFERENCE TO RELATED APPLICATIONS

This application is a National Stage of International Application No. PCT/US2014/037503, filed May 9, 2014. This application claims benefit of U.S. Provisional Patent Application No. 61/821,919 filed May 10, 2013. The disclosures of the above applications are incorporated herein by reference.

FIELD OF THE INVENTION

The present invention relates to a "heads-up" vehicle display.

BACKGROUND OF THE INVENTION

Projectors are commonly used to project an image onto a screen. Known projectors use projection onto screens from the front and rear.

Typical screens that are always transparent allow a user to see through the screen, but such screens have significant issues with ambient light which attributes to poor quality images. While transparent screens give the viewer a viewable image on a screen, it is known that such screens have significant issues with ambient light conditions and/or low light including any type of outdoor lighting or other source. Conversely, while typical screens that are opaque have improved images, they do not permit an individual to have a clear view through the screen when desired. Therefore, there is a long-felt need to have an adjustable screen for displaying images which is transparent in nature, but which can selectively show at least one image of higher quality.

Accordingly, there exists a need for a projector utilizing an adjustable projection screen which is capable of selectively projecting an image onto the screen when opaque and, when desired to make the screen transparent to allow viewability through the screen.

SUMMARY OF THE INVENTION

The present invention is directed to a projector assembly having a projecting device and an opaque/transparent projection screen. There is provided a display screen and a projector suitable configured for rear projecting images onto a liquid crystal display (LCD) film screen such that the images are visible to a viewer from the front side of the screen. When a user desires to not have an image projected and/or under predetermined conditions, the projector is turned off and power is simultaneously applied to the LCD film which becomes substantially transparent to allow the user to see clearly through the screen.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWING

The present invention will become more fully understood from the detailed description and the accompanying drawing, wherein:

FIG. 1 is a perspective view of a projector assembly having a projecting device and a selectively opaque/transparent projection screen, in accordance with the present invention.

DETAILED DESCRIPTION OF THE PREFERRED EMBODIMENTS

The following description of the preferred embodiment(s) is merely exemplary in nature and is in no way intended to limit the invention, its application, or uses.

The present invention provides a projector assembly that is suitable for rear projecting an image onto a screen while also having the ability to make the screen transparent when desired. The present invention is ideally suited to be in the line of sight of a driver of a vehicle whom from time-to-time desires an in-vehicle display, but the remainder of the time needs a clear view of the road. The projector assembly selectively projects an image onto a film screen, e.g., LCD film screen, from the rear and the image is clearly visible to the viewer from the front side since the screen is opaque. When a projecting device of the projector assembly is turned off, no images are projected and power is simultaneously applied to the LCD film which causes the screen to become transparent. The projector assembly also has a control unit suitable for controlling the projecting device and application of power to coordinating the projected image to the screen with the powered/unpowered states, such that when the projected image is removed, as in no longer projected, power is simultaneously supplied and the screen becomes clear so the user can see through the screen; and when the projected image returns, as in the image is projected from the projecting device, the power is no longer applied to the screen/film and the screen becomes opaque so the user can see the image clearly.

Referring generally to FIG. 1, there is provided a projector assembly, generally shown at 10, including a projecting device, generally shown at 12, and a display screen, generally shown at 14, which is selectively changeable from opaque to transparent. The display screen 14 and projecting device 12 are suitably configured to allow rear projection from the projecting device 12 to the display screen 14 such that at least on image, generally shown at 16, is visible to a viewer from the a front side 18 of the screen.

The display screen 14 allows rear projecting of the image 18 onto the display screen 14 when the display screen 14 is opaque, while also allowing the display screen 14 to become transparent when desired for viewability through the screen when an image is not being projected. One particular advantage of the operably positioned projector assembly 10 is allowing at least one image 18 to be generally in the line of sight of a driver and/or a passenger in a motor vehicle from time-to-time under predetermined conditions when an in-vehicle display is desired. By way of non-limiting example, certain images can be displayed when the vehicle is parked or the same or other images can be displayed under other predetermined conditions, providing a heads-up in-vehicle display.

Another advantage the projector assembly 10 is a substantially clear view through the screen is provided when desired, e.g., to view the road in front of the motor vehicle. The projector assembly 10 is ideally suited to project at least one image in the line of sight of a vehicle occupant(s) from time-to-time as desired, e.g., under predetermined conditions to provide an in-vehicle display generally forward of the occupant, but the remainder of the time provides a clear view therethrough.

The display screen 14 comprises panels, e.g., of polarized glass panels, and has a film 20, most preferably a thin LCD film, which enables the display screen to be selectively changed between transparent and opaque. The film 20 has a predetermined thickness and substantially covers the front side 18 of the screen. The projecting device 12 projects at least one image onto the LCD film screen from the rear and the image is clearly visible to the viewer from the front side 18 since the screen is opaque in the unpowered state and the image is projected onto the screen. When the projector 12 is turned off, a predetermined voltage is simultaneously applied to the LCD film which becomes transparent. The display screen 14 is transparent when in this powered state.

The projecting device 12 has a housing, shown generally at 22, at least partially enclosing the projector 12. As illustrated in FIG. 1, the projecting device 12 is rear projecting through an aperture onto the film 20 and is obscured in the housing 22. The projecting device 12 can, alternatively, not be obscured in the housing 22. The housing 22 can additionally have fasteners and suitable mechanical devices for mounting the projecting device 12 and/or display screen 14 at predetermined locations, e.g., on, in, or adjacent to an instrument panel, vehicle interior dash panel, windshield frame, cluster bezel, etc.

The projector assembly 10 projector 12 can be of any size suitable for providing a heads up in-vehicle display and use any kind of operable projection technology, e.g., LCOS, DLP, and/or laser, suitable for selectively projecting at least one image onto the display screen 14. "LCD" means, e.g., liquid crystal display. "LCD film", e.g., liquid crystal display film, including, thin clear protective film and anti-glare features. "LCOS" means, e.g., Liquid crystal on silicon. "DLP", means, e.g., Digital Light Processing.

The display screen 14 is changeable from clear to opaque and back and is capable of showing at least one projected image, most preferably, a plurality of images/data points at once. The projection assembly 10 further comprises at least one control device coupled to a power supply for the selective application of voltage. The control device is operable suitable for timing the projecting device 12 to the display screen 14 such that when the projected image is removed from the screen, the display screen 14 becomes clear and when the projected image returns to the screen 14, the display screen 14 becomes opaque. When the projector 12 is turned off, power is simultaneously applied to the LCD film which becomes transparent. In the unpowered state, the display screen 14 is opaque and the image can be projected and clearly visible.

FIG. 1 depicts examples of images, as non-limiting examples of viewable projectable images, i.e., pictorial, word(s), branding, schematic(s), graphic(s), communication, data, sensed data, setting(s) (such as indoor/outdoor temperature, speed, controls, etc), coordinates (such as motor vehicle location, destinations, global positioning, navigation, etc), view(s) (such as rear views and blind spots, etc), and any other desirable images and/or information and combinations thereof.

In accordance with another embodiment of the present invention, the projector assembly 10 further comprises incorporated graphical interface and/or touch screen features. In addition, further incorporation with a proximity switch and/or any sensor and/or control switch suitable for manually and/or automatically turning the projector on and/or off under desirable predetermined conditions is also contemplated.

The description of the invention is merely exemplary in nature and, thus, variations that do not depart from the essence of the invention are intended to be within the scope of the invention. Such variations are not to be regarded as a departure from the spirit and scope of the invention.

What is claimed is:

1. A projector assembly, comprising:
   a projecting device for selectively rear projecting at least one image;
   a display screen positioned to be in line of sight of a vehicle occupant having a liquid crystal display (LCD) film that is selectively changeable from transparent when the LCD film is in a powered state allowing a user to see through the display screen and providing a clear view of a road through the display screen when in the powered state to a projection state when the LCD film is in an unpowered state, wherein the at least one image rear projected to the display screen is visible to a user generally from a front side of the display screen when the LCD film is in the projection state; and
   at least one control device that coordinates application of power to the LCD film when said projecting device is not projecting the at least one image.

2. The projector assembly of claim 1, wherein said film is located toward a front side of said display screen and said projecting device rear projects said at least one image onto said film.

3. The projector assembly of claim 1, wherein said projecting device further comprises a housing and said at least one image is projected through at least one aperture in said housing.

4. The projector assembly of claim 3, wherein said projecting device is obscured in said housing.

5. The projector assembly of claim 1, wherein said projecting device is not obscured in a housing.

6. The projector system of claim 1, wherein when said projecting device is turned off, a predetermined amount of power is simultaneously applied to said LCD film which becomes transparent.

7. The projector system of claim 1, wherein said projector system is operably connected to a component in a motor vehicle and is operably positioned and suitably configured to provide a heads-up in-vehicle display.

8. The projector system of claim 1, wherein said at least one control device further comprises an on/off device operable to manually and/or automatically activate/deactivate the projection of said at least one image under desirable predetermined conditions.

9. The projector system of claim 8, wherein said on/off device is selected from the group consisting of at least one sensor, proximity switch, control switch, touch screen option, and combinations thereof.

10. The projector system of claim 1, wherein said at least one control device is a control unit coupled to said projector system and a power source for timing said projecting device to said display screen, such that when said projecting device is turned off and/or said at least one image is removed from said display screen, power is simultaneously applied to said display screen creating a powered state in which said display screen becomes transparent, and when said at least one image is projected onto said display screen no power is applied to said display screen allowing an unpowered state in which said at least one image is viewable on said display screen.

11. The projector system of claim 1, wherein said projecting device is selected from the group consisting of liquid crystal on silicon (LCOS), digital light processing (DLP), and laser.

12. A method of projection of at least one image using a projector system that is a heads-up in-vehicle display, comprising:
providing a projecting device for selectively rear projecting at least one image;
providing a display screen having a liquid crystal display (LCD) film that is changeable from transparent when the LCD film is in a powered state allowing a user to see a road through the display screen one image rear projected to the display screen is visible to a user generally from a front side of the display screen when the LCD film is in the projection state;
providing at least one control device that coordinates application of voltage to the LCD film when said projecting device is not projecting the at least one image to change said display screen to be transparent for viewability through said display screen; and
rear projecting said at least one image onto said LCD film when in the unpowered state, wherein the at least one image rear projected to the display screen is visible to a user generally from a front side of the display screen when in the projection state.

13. The method of claim 12, wherein said at least one control device is control unit coupled to said projector system and a power source for timing said projecting device to said display screen, such that when said projecting device is turned off and/or said at least one image is removed from said display screen, power is simultaneously applied to said display screen creating a powered state in which said display screen becomes transparent, and when said at least one image is projected onto said display screen no power is applied to said display screen allowing an unpowered state in which said at least one image is viewable on said display screen.

14. A projector system for a heads-up motor vehicle display, comprising:
a display screen including a liquid crystal display (LCD) film toward a front side;
a projecting device operably configured for rear projecting at least one image onto said display screen when said display screen is in a projection state to display said rear projected at least one image;
at least one control device, wherein said projecting device is operably timed with said display screen using said at least one control device such that when said projected at least one image is removed from said display screen under predetermined conditions, the display screen becomes transparent to view a road through the display screen, and when said projected at least one image returns to said display screen under predetermined conditions, said display screen changes to the projection state to view said at least one image on said display screen.

* * * * *